(12) United States Patent
Sheth et al.

(10) Patent No.: US 12,267,357 B2
(45) Date of Patent: *Apr. 1, 2025

(54) VERIFYING THE TRUST-WORTHINESS OF ARP SENDERS AND RECEIVERS USING ATTESTATION-BASED METHODS

(71) Applicant: Cisco Technology, Inc., San Jose, CA (US)

(72) Inventors: Sujal Sheth, Gujarat (IN); Shwetha Subray Bhandari, Bangalore (IN); William F. Sulzen, Apex, NC (US); Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/672,502

(22) Filed: Feb. 15, 2022

(65) Prior Publication Data

US 2022/0174091 A1 Jun. 2, 2022

Related U.S. Application Data

(63) Continuation of application No. 16/712,584, filed on Dec. 12, 2019, now Pat. No. 11,277,442.

(Continued)

(51) Int. Cl.
*H04L 9/40* (2022.01)
*H04L 61/103* (2022.01)

(52) U.S. Cl.
CPC ........ *H04L 63/1466* (2013.01); *H04L 61/103* (2013.01); *H04L 63/126* (2013.01)

(58) Field of Classification Search
CPC . H04L 63/1466; H04L 61/103; H04L 63/126; H04L 2101/622
See application file for complete search history.

(56) References Cited

U.S. PATENT DOCUMENTS

| 6,189,042 B1 | 2/2001 | Keller-Tuberg |
| 6,249,623 B1 | 6/2001 | Patrick et al. |

(Continued)

FOREIGN PATENT DOCUMENTS

| CN | 1825853 A | 8/2006 |
| CN | 103152335 A | 6/2013 |

(Continued)

OTHER PUBLICATIONS

D. Bruschi, A. Ornaghi and E. Rosti, "S-ARP: a secure address resolution protocol," 19th Annual Computer Security Applications Conference, 2003. Proceedings., Las Vegas, NV, USA, 2003, pp. 66-74 (Year: 2003).*

(Continued)

*Primary Examiner* — Zhimei Zhu
(74) *Attorney, Agent, or Firm* — Polsinelli P.C.

(57) ABSTRACT

Systems, methods, and computer-readable media for assessing reliability and trustworthiness of devices operating within a network. An ARP responder can receive an ARP request from an ARP requestor for performing address resolution between the ARP requestor and the ARP responder in a network environment. The ARP responder can build an ARP response including attestation information of the ARP responder. Further, the ARP responder can provide, to the ARP requestor, the attestation information for verifying the ARP responder using the ARP response and the attestation information of the ARP responder.

20 Claims, 9 Drawing Sheets

Related U.S. Application Data

(60) Provisional application No. 62/830,162, filed on Apr. 5, 2019.

(56) References Cited

U.S. PATENT DOCUMENTS

| | | | |
|---|---|---|---|
| 6,675,206 | B1 | 1/2004 | Britton et al. |
| 6,771,649 | B1 * | 8/2004 | Tripunitara ............. H04L 45/00 370/395.54 |
| 7,234,163 | B1 | 6/2007 | Rayes et al. |
| 7,237,267 | B2 | 6/2007 | Rayes et al. |
| 7,360,245 | B1 | 4/2008 | Ramachandran et al. |
| 7,464,183 | B1 | 12/2008 | Ioffe et al. |
| 7,469,418 | B1 | 12/2008 | Wilkinson et al. |
| 7,523,485 | B1 | 4/2009 | Kwan |
| 7,562,390 | B1 * | 7/2009 | Kwan .................. H04L 63/0236 726/23 |
| 8,117,657 | B1 | 2/2012 | Elrod et al. |
| 8,966,608 | B2 | 2/2015 | Jarredal |
| 8,966,698 | B2 | 3/2015 | Mok et al. |
| 9,036,504 | B1 | 5/2015 | Miller et al. |
| 9,525,671 | B1 | 12/2016 | Worsley |
| 10,205,698 | B1 | 2/2019 | Petersen et al. |
| 10,440,044 | B1 | 10/2019 | Zini et al. |
| 10,693,866 | B2 | 6/2020 | Ben-Shalom et al. |
| 11,882,176 | B2 * | 1/2024 | Sheth .................. H04L 61/4511 |
| 2002/0013844 | A1 | 1/2002 | Garrett et al. |
| 2002/0016858 | A1 | 2/2002 | Sawada et al. |
| 2003/0070007 | A1 | 4/2003 | Tchakmakjian |
| 2003/0172144 | A1 * | 9/2003 | Henry ................. H04L 63/1458 709/223 |
| 2005/0147097 | A1 | 7/2005 | Chari et al. |
| 2006/0088037 | A1 | 4/2006 | Finley, Jr. et al. |
| 2006/0221979 | A1 | 10/2006 | Cheshire et al. |
| 2007/0248085 | A1 | 10/2007 | Volpano |
| 2008/0107065 | A1 | 5/2008 | Lescuyer et al. |
| 2009/0013181 | A1 | 1/2009 | Choi et al. |
| 2010/0088399 | A1 | 4/2010 | Gluck |
| 2010/0107162 | A1 | 4/2010 | Edwards et al. |
| 2010/0107250 | A1 | 4/2010 | Li |
| 2010/0241744 | A1 | 9/2010 | Fujiwara |
| 2011/0010769 | A1 | 1/2011 | Järredal |
| 2011/0029645 | A1 | 2/2011 | Baykal et al. |
| 2013/0111589 | A1 | 5/2013 | Cho |
| 2013/0212249 | A1 | 8/2013 | Groat et al. |
| 2014/0325651 | A1 | 10/2014 | Kim et al. |
| 2015/0058968 | A1 | 2/2015 | Wang et al. |
| 2015/0143118 | A1 | 5/2015 | Sheller et al. |
| 2015/0358345 | A1 | 12/2015 | Clark et al. |
| 2016/0142365 | A1 | 5/2016 | Devarajan |
| 2017/0093912 | A1 | 3/2017 | Poomalai et al. |
| 2017/0221066 | A1 | 8/2017 | Ledford et al. |
| 2017/0289138 | A1 | 10/2017 | Ben-Shalom et al. |
| 2018/0027012 | A1 | 1/2018 | Srinivasan et al. |
| 2018/0219909 | A1 | 8/2018 | Gorodissky et al. |
| 2019/0020679 | A1 | 1/2019 | Qu et al. |
| 2019/0058731 | A1 | 2/2019 | Garg et al. |
| 2019/0297050 | A1 | 9/2019 | Chu et al. |
| 2020/0084284 | A1 | 3/2020 | Chauhan |
| 2020/0169527 | A1 | 5/2020 | Cheng et al. |
| 2020/0322375 | A1 | 10/2020 | Sheth et al. |

FOREIGN PATENT DOCUMENTS

| | | | |
|---|---|---|---|
| CN | 106453308 | A | 2/2017 |
| CN | 108123943 | A | 6/2018 |
| CN | 109698868 | A | 4/2019 |
| GB | 2458154 | A | 9/2009 |
| KR | 100201574 | B1 | 6/1999 |
| KR | 20180086610 | A | 8/2018 |
| WO | WO-2010041788 | A1 * | 4/2010 ....... H04L 29/12028 |
| WO | WO 2012/153913 | A1 | 11/2012 |
| WO | WO 2013/020501 | A1 | 2/2013 |

OTHER PUBLICATIONS

Attestation definition by Merriam-Webster Dictionary, obtained online from <https://www.merriam-webster.com/dictionary/attestation>, retrieved on Feb. 24, 2024.*

D. J. Tian, K. R. B. Butler, J. I. Choi, P. McDaniel and P. Krishnaswamy, "Securing ARP/NDP From the Ground Up," in IEEE Transactions on Information Forensics and Security, vol. 12, No. 9, pp. 2131-2143, Sep. 2017 (Year: 2017).*

A. Nehra, M. Tripathi and M. S. Gaur, "FICUR: Employing SDN programmability to secure ARP," 2017 IEEE 7th Annual Computing and Communication Workshop and Conference (CCWC), Las Vegas, NV, USA, 2017, pp. 1-8 (Year: 2017).*

B. Bakhache and R. Rostom, "Kerberos secured Address Resolution Protocol (KARP)," 2015 Fifth International Conference on Digital Information and Communication Technology and its Applications (DICTAP), Beirut, Lebanon, 2015, pp. 210-215 (Year: 2015 ).*

Abad et al., "An Analysis on the Schemes for Detecting and Preventing ARP Cache Poisoning Attacks", 2007 (Year: 2007).

Bakhache et al., "Kerberos Secured Address Resolution Protocol (KARP)", 2015 (Year: 2015).

Cox Jr et al., "Leveraging SDN for ARP Security", 2016 (Year: 2016).

Dictionary.com, "attestation", 2021 (Year: 2021).

Hammouda et al., "An Enhanced Secure ARP Protocol and LAN Switch for Preventing ARP based Attacks", 2009 (Year: 2009).

Issac et al., "Secure Unicast Address Resolution Protocol (S-UARP) by Extending DHCP", 2005 (Year: 2005).

Li et al., "Transparent Interconnection of Lots of Links (TRILL): ARP and Neighbor Discovery (ND) Optimization", RFC 8302, 2018 Year: 2018).

Limmaneewichid et al., "The Cryptographic Trailer Based Authentication Scheme for ARP", 2011 (Year: 2011).

Lootah et al., "TARP: Ticket-based Address Resolution Protocol", 2005 (Year: 2005).

Matties, "Distributed Responder ARP: Using SDN to Re-Engineer ARP from within the Network", 2017 (Year: 2017).

Meghana et al., "A Survey on ARP Cache Poisoning And techniques for detection and mitigation", 2017 (Year: 2017).

Nam et al., "Mitigating ARP poisoning-based man-in-the-middle attacks in wired and wireless LAN", 2012 (Year: 2012).

Ortega et al., "Preventing ARP Cache Poisoning Attacks: A Proof of Concept using OpenWrt", 2009 (Year: 2009).

Pandey, "Prevention of ARP Spoofing: A Probe Packet based Technique", 2012 (Year: 2012).

Prevelakis et al., "LS-ARP: A Lightweight and Secure ARP", 2017 (Year: 2017).

Ramachandran et al., "Detecting ARP Spoofing: An Active Technique", 2005 (Year: 2005).

Tian et al., "Securing ARP From the Ground Up", 2015 (Year: 2015).

Tian et al., "Securing ARP/NDP From the Ground Up", 2017 (Year: 2017).

Trabelsi et al., "Preventing ARP Attacks using a Fuzzy-Based Stateful ARP Cache", 2007 (Year: 2007).

* cited by examiner

VERIFYING THE TRUST-WORTHINESS OF ARP SENDERS AND RECEIVERS USING ATTESTATION-BASED METHODS

CROSS-REFERENCE TO RELATED APPLICATIONS

This application is a continuation of U.S. Non-Provisional patent application Ser. No. 16/712,584, filed Dec. 12, 2019, which claims the benefit of U.S. Provisional Patent Application No. 62/830,162, filed Apr. 5, 2019, the contents of which are incorporated herein by reference in their entireties.

TECHNICAL FIELD

The present disclosure generally relates to the field of computer networking, and more particularly to assessing reliability and trustworthiness of devices operating within a network.

BACKGROUND

Trustworthiness of a given device operating within a network may degrade from the time of its initial configuration. Active measurements may be needed to validate that a device is equivalently trustworthy to the time of its initial deployment. New technologies are adding capabilities which support the secure, real-time reporting of active trustworthiness measurements/evaluation from a remote device. Specifically, all-in-one chips have been used to implement secure boot modules, trust anchor modules, and secure Joint Test Action Group (JTAG) solutions for verifying the trustworthiness of devices. Further, tokens or metadata elements containing security measurements or security evidence have been developed for verifying the trustworthiness of devices.

Based on the results from such technologies, additional analysis and remediation methods can be invoked to reduce/mitigate the effects of attacks. For example, an Integrity Verification application based on a controller can invoke the validating specific portions of device memory. When errors are found during such a check, it allows the Integrity Verification application to implement steps in order for a device to be returned to a good state.

Such memory verification checks are expensive however and such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

Device verification is particularly relevant to hosts in network environments that perform address resolution using the Address Resolution Protocol (ARP). ARP is a fundamental part of IPv4 network connectivity. Operating below the network layer, ARP binds an Internet Protocol (IP) address to the Media Access Control (MAC) identifier/address of a network device. ARP is subject to a variety of attacks including spoofing and cache poisoning. Tools such as dsniff and nemesis can be used respectively to easily launch such attacks. An attack on ARP can subsequently enable more sophisticated denial-of-service (DoS) attacks and man-in-the-middle (MitM) attacks. There therefore exist needs for systems and methods of verifying the trustworthiness of peers performing address resolution through ARP. More specifically, there exist needs for systems and methods of verifying the trustworthiness of peers performing address resolution through ARP and conducting ARP attack mitigation if a peer is identified as untrustworthy.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
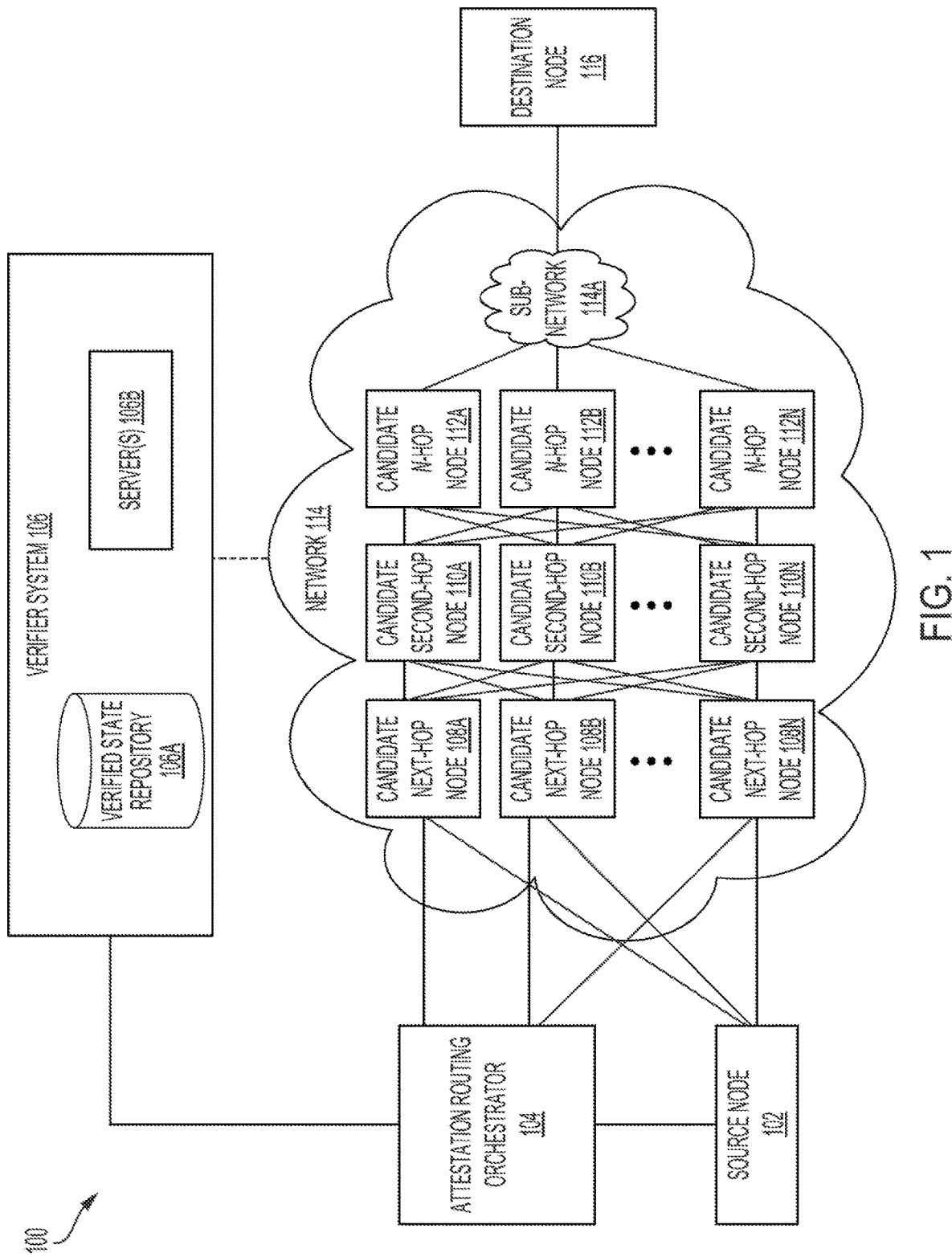
FIGS. 1 through 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for verifying the trustworthiness of ARP peers using attestation.

A method can include receiving, at an ARP responder, an ARP request from an ARP requestor for performing address resolution between the ARP responder and the ARP requestor in a network environment. The method can also include building, by the ARP responder, an ARP response including attestation information of the ARP responder. Further, the method can include providing, from the ARP responder to the ARP requestor, the ARP response and the attestation information for verifying the ARP responder using the ARP response and the attestation information of the ARP responder.

A system can include one or more processors and at least one computer-readable storage medium storing instructions which, when executed by the one or more processors, cause the one or more processors to receive, at an ARP responder, an ARP request from an ARP requestor for performing address resolution between the ARP responder and the ARP requestor in a network environment. The instructions can also cause the one or more processors to build, by the ARP responder, an ARP response including attestation information of the ARP responder. Further, the instructions can cause the one or more processors to provide, from the ARP responder to the ARP requestor, the ARP response and the attestation information for verifying the ARP responder using the ARP response and the attestation information of the ARP responder. Additionally, the instructions can cause the one or more processors to perform ARP attack mitigation in the network environment if the ARP responder is not verified using the attestation information in the ARP response.

A non-transitory computer-readable storage medium having stored therein instructions which, when executed by a processor, cause the processor to receive, at an ARP responder, an ARP request from an ARP requestor for performing address resolution between the ARP responder and the ARP requestor in a network environment. The instructions can also cause the processor to build, by the ARP responder, an ARP response including attestation information of the ARP responder. Further, the instructions can cause the processor to provide, from the ARP responder to the ARP requestor, the ARP response and the attestation information for verifying the ARP responder using the ARP response and the attestation information of the ARP responder. Additionally, the instructions can cause the processor to extract a MAC address of the ARP responder and an IP address of the ARP responder from the ARP response. The instructions can also cause the processor to add an ARP entry including a mapping of the MAC address of the ARP responder with the IP address of the ARP responder in an ARP mapping data store if the ARP responder is verified using the attestation information in the ARP response.

The foregoing, together with other features and embodiments, will become more apparent upon referring to the following specification, claims, and accompanying drawings.

Example Embodiments

The disclosed technology addresses the need in the art for verifying trustworthiness of ARP peers using attestation. The present technology involves system, methods, and computer-readable media for verifying the trustworthiness of peers performing address resolution through ARP. Further, the present technology involves systems, methods, and computer-readable media for conducting ARP attack mitigation if a peer is identified as untrustworthy.

Figure 8:
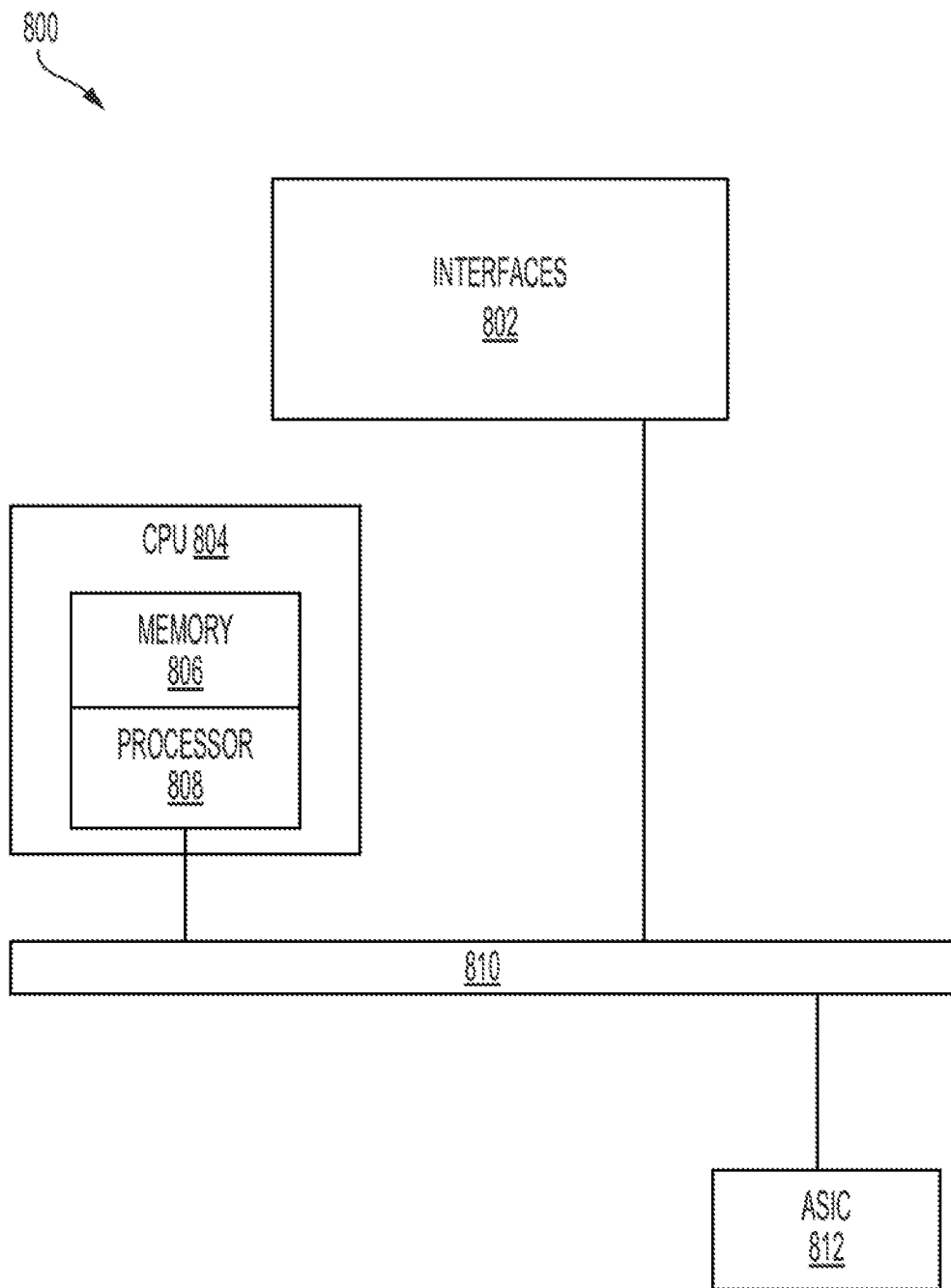
FIG. 8 illustrates an example network device in accordance with some examples.
Figure 9:
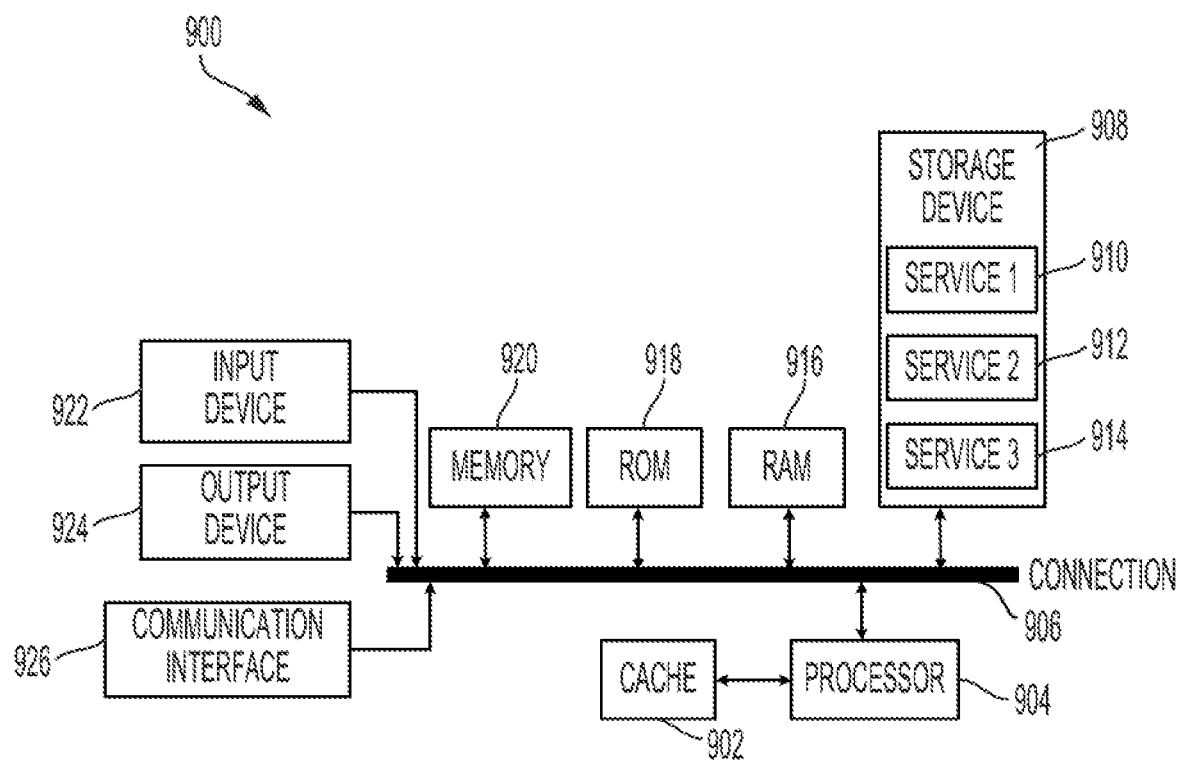
FIG. 9 illustrates an example computing device architecture in accordance with some examples.

Disclosed herein are systems, methods and computer-readable storage media for verifying trustworthiness of ARP peers using attestation. The present technologies will be described in more detail in the following disclosure as follows. The disclosure begins with an initial discussion of systems and technologies for providing explicit verifiable proof of integrity of network nodes traversed by packets. A description of example systems, methods and environments for providing verifiable proof of integrity of network nodes including ARP peers establishing communication channels through ARP, as illustrated in FIGS. 1 through 7, will then follow. The discussion concludes with a description of an example network device and an example computing device architecture, as illustrated in FIGS. 8 and 9, including example hardware components suitable for performing various networking and computing operations described herein.

The disclosure now turns to an initial discussion of example concepts and technologies for providing verifiable proof of integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value||hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Having provided an initial discussion of example concepts and technologies for providing explicit verifiable proof of integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

Figure 2:
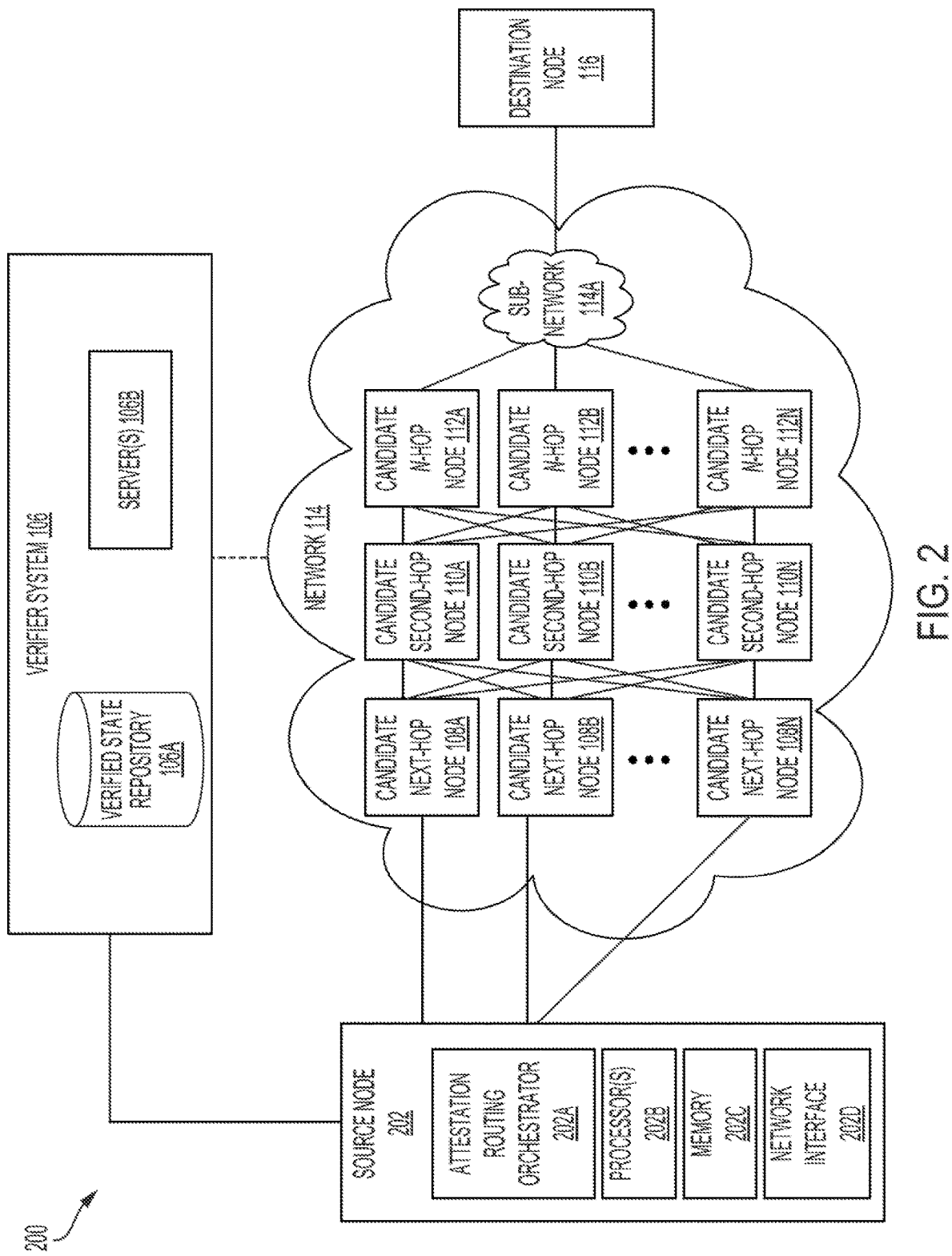

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
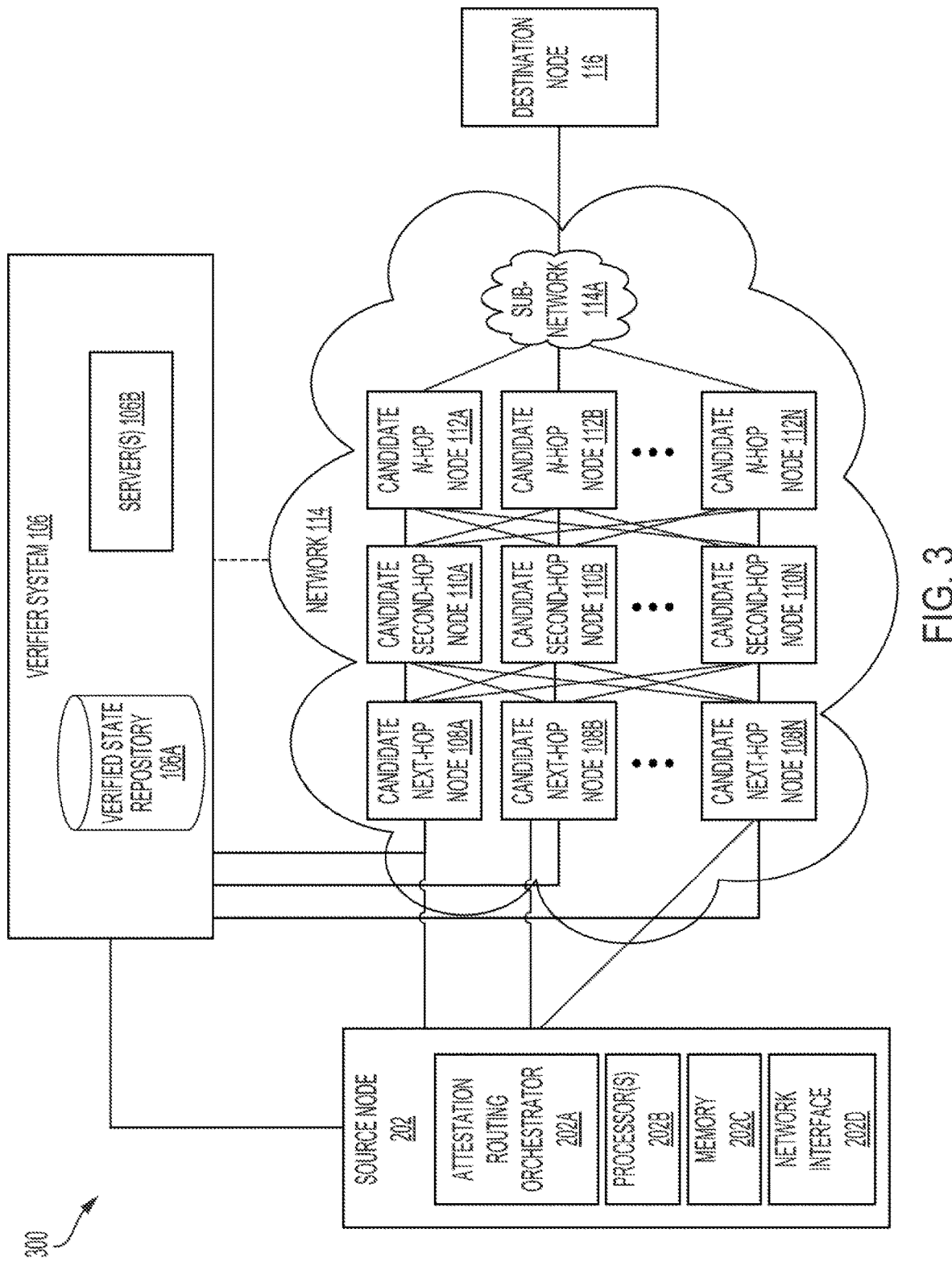

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
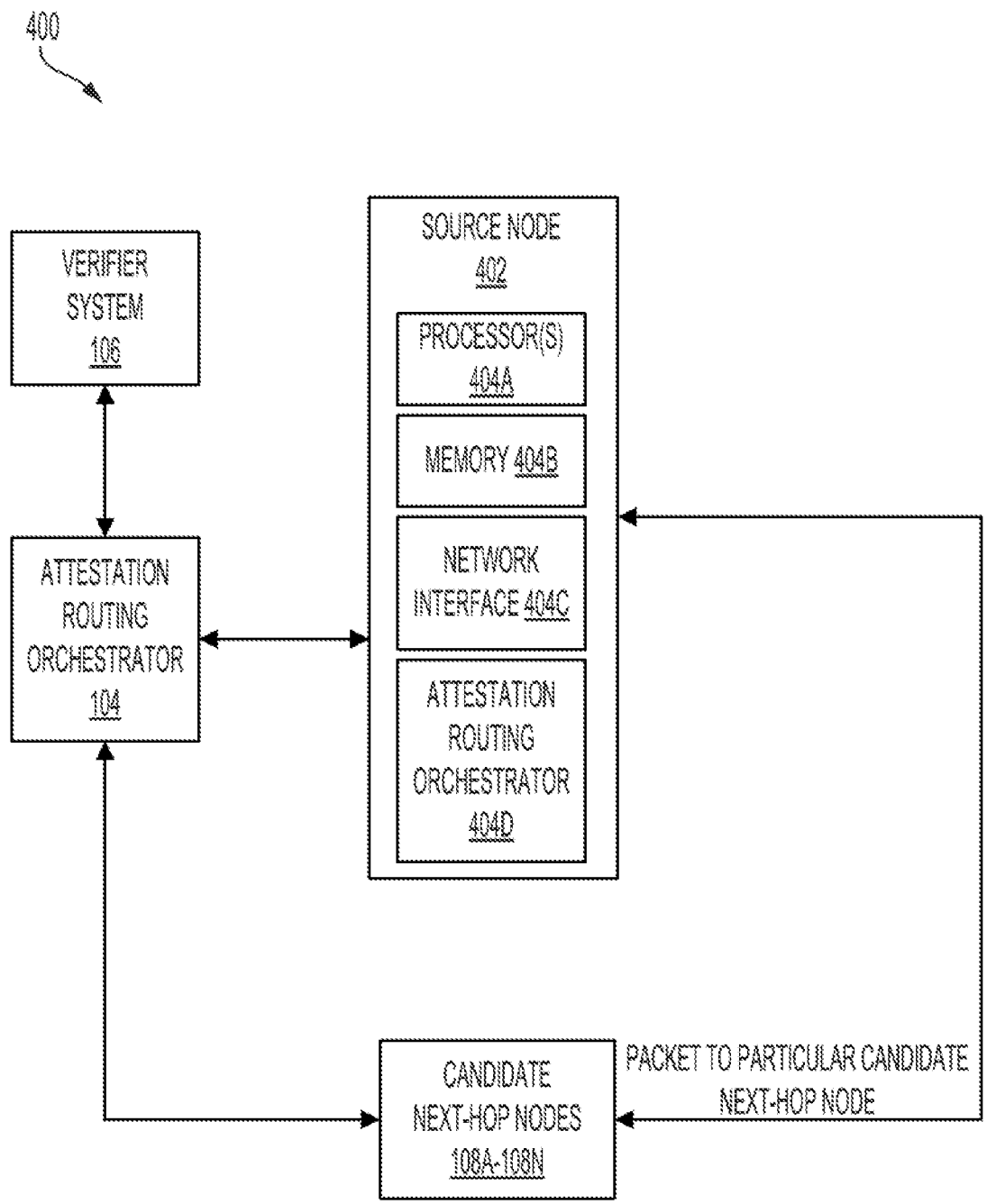
FIG. 4 illustrates an example of a controller orchestrated attestation-based routing, in accordance with some examples.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can directs, to the particular candidate next-hop node, a data packet destined for the destination node. For example, in some cases, the attestation routing orchestrator 104 can provide attested route information (e.g., validated canary stamp data, security measurements, etc.) to an attested route manager 404D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 404D can select a particular candidate score based on one or more selection criteria. Moreover, the attested route manager 404D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 404A. The one or more processors 404A can provide processing resources for managing attested route information obtained from the attestation routing orchestrator 104. The source node 402 can also include a memory 404B. The memory 404B can include, for example, a non-transitory memory such as RAM, ROM, etc. In some examples, the memory 404B can store data such as the obtained attested route information and data packets to be transmitted. The source node 402 can also include a network interface 404C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

As a further advantage of the present disclosure, it should be noted that encryption alone may be insufficient to protect sensitive flows since there are scenarios where even the fact that a flow is occurring between endpoints might be considered information to be protected (e.g., in a battlefield).

As discussed previously, device verification is particularly relevant to hosts in network environments that perform address resolution through ARP. ARP is a fundamental part of IPv4 network connectivity. Operating below the network layer, ARP binds an IP address to the MAC identifier of a network device. ARP is subject to a variety of attacks including spoofing and cache poisoning. Tools such as dsniff and nemesis can be used respectively to easily launch such attacks. An attack on ARP can subsequently enable more sophisticated DoS attacks and MitM attacks.

The present includes systems, methods, and computer-readable media for solving these problems/discrepancies. Specifically, the present technology involves system, methods, and computer-readable media for verifying ARP peers through attestation. Additionally, the present technology involves systems, methods, and computer-readable media for performing ARP attack mitigation if a peer is identified as untrustworthy.

Figure 5:
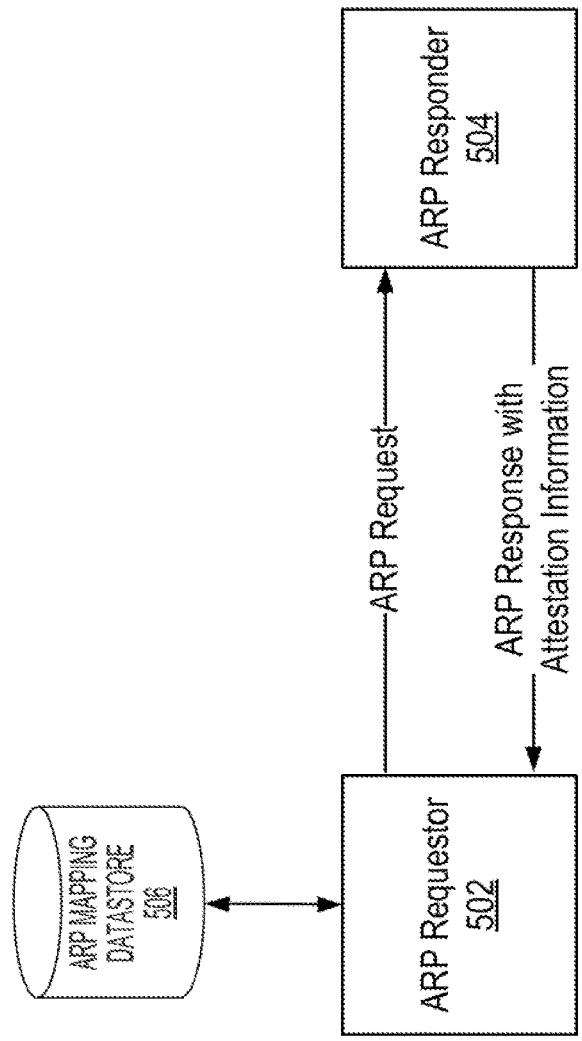
FIG. 5 illustrates an example network environment for verifying ARP peers through attestation.

FIG. 5 illustrates an example network environment 500 for verifying ARP peers through attestation. As used herein, verifying an ARP peer, e.g. an ARP requestor or responder, includes verifying the trustworthiness/integrity of an ARP peer. For example, and as will be discussed in greater detail later, verifying an ARP peer can include verifying the integrity of hardware and/or software associated with the peer. Verifying an ARP peer can include determining one or more trust/integrity levels or extents of the ARP peer. In turn, the trustworthiness/integrity of the ARP peer can be quantified or qualified with respect to the identified trust/integrity levels or extents. For example, trustworthiness of an ARP peer can be quantified or qualified by comparing an identified trust level of the ARP peer with threshold trust levels or extents for ARP peers in a network environment.

The techniques for verifying ARP peers and/or performing ARP attack mitigation, as discussed with respect to the example network environment 500 shown in FIG. 5, can be implemented in an applicable network environment that uses ARP to map IP address to hardware addresses, e.g. MAC addresses. Specifically, the techniques described with respect to the network environment 500 shown in FIG. 5 can be implemented in an applicable IPv4 network environment. Further, the techniques for verifying ARP peers and/or performing ARP attack mitigation, as discussed with respect to the example network environment 500 shown in FIG. 5, can be implemented in an applicable network environment for proving packet transit through uncompromised nodes, such as the example environments 100, 200, and 300 shown in FIGS. 1-3.

The example network environment 500 includes an ARP requestor 502 and an ARP responder 504. Both the ARP requestor 502 and the ARP responder 504 function as applicable hosts/nodes in a network environment. Specifically, the ARP requestor 502 and the ARP responder 504 can send and receive data, e.g. as part of providing and/or accessing network services, through a network environment. More specifically, the ARP requestor 502 and the ARP responder 504 can exchange data with each other according to ARP for purposes of discovering a link layer address associated with, or falsely associated with in the case of a host in an ARP attack, a specific internet layer address.

In exchanging information according to ARP for discovering a link layer address associated with a specific internet layer address, the ARP requestor 502 can send an ARP request to the ARP responder 504. The ARP request can include a request for a link layer address associated with a specific internet layer address. Further, the ARP request can be generated based on the ARP requestor 502 being unable to find a link layer address associated with the specific internet layer address, e.g. in a cached ARP table/ARP mapping accessible to the ARP requestor 502. The ARP requestor 502 can send the ARP request as part of a broadcast message that is sent to all nodes, including the ARP responder 504, in a local network associated with the ARP requestor 502.

The ARP responder 504 can respond to the ARP requestor 502 with an ARP response. The ARP response can include a link layer address of the ARP responder 504 and the specific internet layer address included in the ARP request. The ARP response can include a link layer address that is actually associated with the specific internet layer address. For example and as will be discussed in greater detail later with respect to verifying the ARP responder's 504 trustworthiness based on attestation information, the ARP responder 504 can actually be associated with the specific internet layer address. In turn, the ARP response from the ARP responder 504 can include a link layer address that is actually associated with the specific internet layer address. Alternatively, the ARP response can include a link layer address that is not actually associated with the specific internet layer address. For example and as will be discussed in greater detail later with respect to verifying the ARP responder's 504 trustworthiness based on attestation information, the ARP responder 504 can be a spoofer that replies with their link layer address even though the specific internet layer address is not actually associated with the link layer address of the ARP responder 504.

The ARP responder 504 can build an ARP response that includes attestation information. Specifically, the ARP responder 504 can include attestation information in an ARP response that also includes a link layer address of the ARP responder 504. The attestation information can be generated by the ARP responder 504 itself. Further and as will be discussed in greater detail later, the attestation information can be generated by the ARP responder 504 functioning with a verifier. The attestation information can be generated using an applicable technique for generating data used in verifying the trustworthiness of a device/node, e.g. using the previously described attestation techniques. For example, the attestation information can be generated using a TPM and/or Canary stamps.

Attestation information, as used herein, includes applicable data for verifying the trustworthiness of a device/node. Specifically, attestation information can include the previously described information used in verifying integrity of a node in a network environment. For example, attestation information can include PCR values for verifying integrity of a node in a network environment. The attestation information in the ARP response generated by the ARP responder 504 can include information for verifying trustworthiness of software executed at the ARP responder 504. For example, the attestation information can include an indicator/metadata elements signifying that measurements of software executing at the ARP responder 504 have been verified as expected measurements of software executing at the ARP responder 504. Further, the attestation information in the ARP response can include information for verifying the trustworthiness of hardware of the ARP responder 504. For example, the attestation information in the ARP response can include an indicator/metadata elements signifying that the hardware integrity of the ARP responder 504 has been verified.

The trustworthiness of the ARP responder 504 can be verified using the ARP response received at the ARP requestor 502 from the ARP responder 504. Specifically and as will be discussed in greater detail later, the trustworthiness of the ARP responder 504 can be verified by the ARP requestor 502 based on the attestation information included in the received ARP response. Further and as will be discussed in greater detail later, the trustworthiness of the ARP responder 504 can be verified based on the attestation information by both the ARP requestor 502 and a verifier functioning together.

The ARP requestor 502 can extract a link layer address and an internet layer address of the ARP responder 504 from the ARP response. In turn, if the trustworthiness of the ARP responder 504 is verified, then the ARP requestor 502 can perform applicable actions for facilitating communication between the ARP requestor 502 and the ARP responder 504 based on the extracted link layer address. Specifically, if the trustworthiness of the ARP responder 504 is verified, then the ARP requestor 502 can add an entry including a mapping of the link layer address to the internet layer address, e.g. as part of an ARP-table, in an ARP mapping datastore 506. Alternatively, if the ARP responder 504 is verified as untrustworthy, the ARP requestor 502 can still add an entry including a mapping of the link layer address to the internet layer address in the ARP mapping datastore 506. Nodes in the network environment 500, e.g. the ARP requestor 502, can use the mapping of the link layer address to the internet layer address in the ARP mapping datastore 506 to communicate with the ARP responder 504 in the network environment 500.

The ARP mapping datastore 506 can be maintained by one or more applicable nodes in the network environment 500. Further, the ARP mapping datastore 506 can be maintained at an applicable location in the network environment 500. For example, entries in the ARP mapping datastore 506 can be maintained by the ARP requestor 502 as part of an ARP cache residing at the ARP requestor 502. In another example, the ARP mapping datastore 506 can be maintained remote from the ARP requestor 502, e.g. in a cloud environment, by one or more nodes in the network environment 500, e.g. the ARP requestor 502.

The data in the ARP mapping datastore 506, e.g. an ARP-table, can be included as part of protected configuration information of one or more nodes in the network environment 500. Specifically, the data in the ARP mapping datastore 506 can be maintained as part of the protected configuration information of either or both the ARP requestor 502 and the ARP responder 504.

Entries in the ARP mapping datastore 506 can be associated with a specific timeout length. A timeout length can specify an amount of time that an entry in the ARP mapping datastore 506 is valid. In turn, the entries in the ARP mapping datastore 506 can be maintained based on the timeout lengths associated with the entries. For example, if a timeout length of an entry has expired, then the entry can be removed from the ARP mapping datastore 506. Entries in the ARP mapping datastore 506 can be associated with varying timeout lengths. For example, a first entry can have a timeout length of one week, while a second entry can have a timeout length of four hours. Timeout lengths of entries in the ARP mapping datastore 506 can vary based on nodes/devices associated with the entries. Specifically, timeout lengths of the entries in the ARP mapping datastore 506 can vary based on verified trustworthiness of the nodes/devices associated with the entries, e.g. using attestation information received in ARP responses from the nodes/devices. For example, if the ARP responder 504 is not verified based on the attestation information, then an entry for the ARP responder 504 can have a shorter timeout length, e.g. with respect to an entry of a verified responder. Conversely, if the ARP responder 504 is verified based on the attestation information, then an entry for the ARP responder 504 can have a longer timeout length, e.g. with respect to an entry of an unverified responder.

ARP attack mitigation can be performed if the trustworthiness of the ARP responder 504 is not verified based on the received attestation data. ARP attack mitigation can be performed to mitigate or otherwise eliminate harmful effects of an ARP attack carried out in the network environment 500. Specifically, ARP attack mitigation can be performed to mitigate effects of an ARP attack carried out by the ARP responder 504 in the event that the ARP responder is actually a spoofer. In turn, this can mitigate or otherwise eliminate more sophisticated DoS attacks and MitM attacks that are facilitated through an ARP attack. ARP attack mitigation can be performed when the ARP responder 504 is not verified even when the ARP responder 504 is not actually malicious. This can further help to preserve security, with respect to ARP susceptibility, in the network environment 500.

ARP attack mitigation can include applicable actions taken to mitigate or otherwise eliminate harmful effects if an ARP attack is actually carried out in the network environment 500. Specifically, ARP attack mitigation can include refraining from adding entries of unverified devices into the ARP mapping datastore 506. More specifically, if the ARP responder 504 is not verified based on the attestation information, then the ARP requestor 502 can refrain from adding a mapping of the link layer address of the ARP responder 504 and the internet layer address to the ARP mapping datastore 506. Alternatively, ARP attack mitigation can include varying timeout lengths of entries in the ARP mapping datastore 506 based on whether a corresponding ARP responder is verified or is not verified. For example, if the ARP responder 504 is not verified, then the ARP requestor 502 can set a shortened timeout length for an entry of the ARP responder 504 in the ARP mapping datastore 506.

Additionally, ARP attack mitigation can include sending an alert indicating that an ARP responder has failed verification based on provided attestation information. Specifically, if the ARP responder 504 fails to be verified based on the provided attestation information, then an alert can be sent indicating that the ARP responder 504 failed verification. An alert indicating that an ARP responder failed verification can be sent to an applicable entity associated with the network environment 500. For example, an alert indicating that the ARP responder 504 failed verification can be sent to a network administrator of the network environment 500. In another example, an alert indicating that the ARP responder 504 failed verification can be sent to neighboring nodes/hosts in the network environment 500. In turn, the entity that receives the alert can act based on the alert to mitigate an impact of an APR attack. For example, a network administrator can prevent the ARP responder 504 from accessing the network environment 500 in response to the received alert.

Further, ARP attack mitigation can include maintaining a log entry indicating that an ARP responder has failed verification based on provided attestation information. The log entry can be included as part of a log of events associated with ARP in the network environment 500. Specifically, the log entry can be included as part of a log of ARP responders who are not verified in the network environment 500. The log entry can include the link layer address provided by the ARP responder 504 in the ARP response. Additionally, the log entry can include a time at which the ARP responder 504 provided the ARP response.

Figure 6:
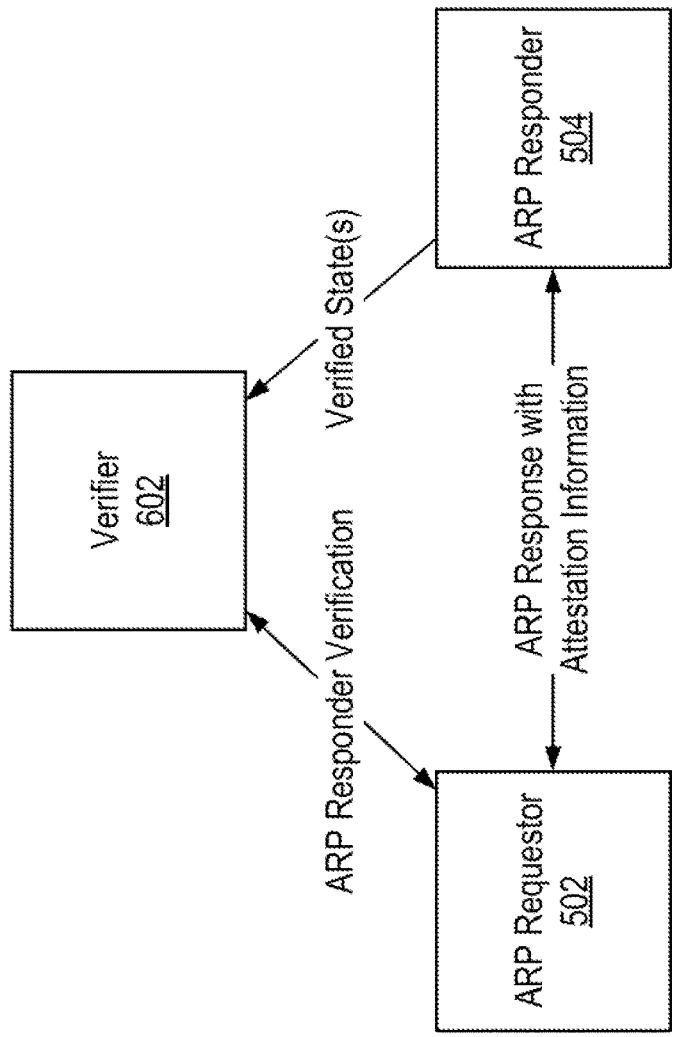
FIG. 6 illustrates an example operational configuration of the network environment for verifying ARP responders based on attestation information.

FIG. 6 illustrates an example operational configuration of the network environment 500 for verifying ARP responders based on attestation information. The network environment 500 includes a verifier 602. The verifier 602 functions according to an applicable system for validating data associated with a node in a network environment for verifying the trustworthiness of the node, such as the verifier system 106 described herein. Specifically, the verifier 602 can maintain or otherwise have access to verified states of nodes in the network environment 500 for purposes of verifying the trustworthiness of the nodes. As discussed previously, a verified state can include one or more verified images, verified security measurements, verified settings, verified node data, and/or any other verified trust or integrity data for verifying the trustworthiness of a node.

In the example operational configuration of the network environment 500 shown in FIG. 5, the ARP responder 504 can provide attestation information to the verifier 602. The attestation information provided to the verifier 602 by the ARP responder 504 can include data for identifying one or more verified states of the ARP responder 504. Specifically, the attestation information provided to the verifier 602 by the ARP responder 504 can include measurements of the ARP responder 504 that are verified to form one or more verified images, verified security measurements, verified settings, verified node data, and/or any other verified trust or integrity data for verifying the trustworthiness of the ARP responder 504.

The ARP responder 504 can provide the attestation information to the ARP requestor 502 as part of an ARP response. The ARP requestor 502 can then communicate with the verifier 602 to validate the trustworthiness of the ARP responder 504 using the received attestation information. As follows, ARP attack mitigation can be performed according to any of the previously described techniques based on whether the ARP responder 504 is verified as trustworthy using the attestation information.

In communicating with the verifier 602 to validate the trustworthiness of the ARP responder 504, the ARP requestor 502 can provide the received attestation information to the verifier 602. The verifier 602 can then remotely verify the trustworthiness of the ARP responder 504 using the attestation information received from the ARP requestor 502. Specifically, the verifier 602 can compare verified states of the ARP responder 504, e.g. as received from the ARP responder 504, with the attestation information of the ARP responder 504 that is received from the ARP requestor 502. Based on the comparison between the verified states and the attestation information of the ARP responder 504, the verifier 602 can either verify the ARP responder 504 as trustworthy or untrustworthy. More specifically, the ARP requestor 502 can effectively verify the trustworthiness of the ARP responder 504 through the verifier 602 based on the attestation information.

Figure 7:
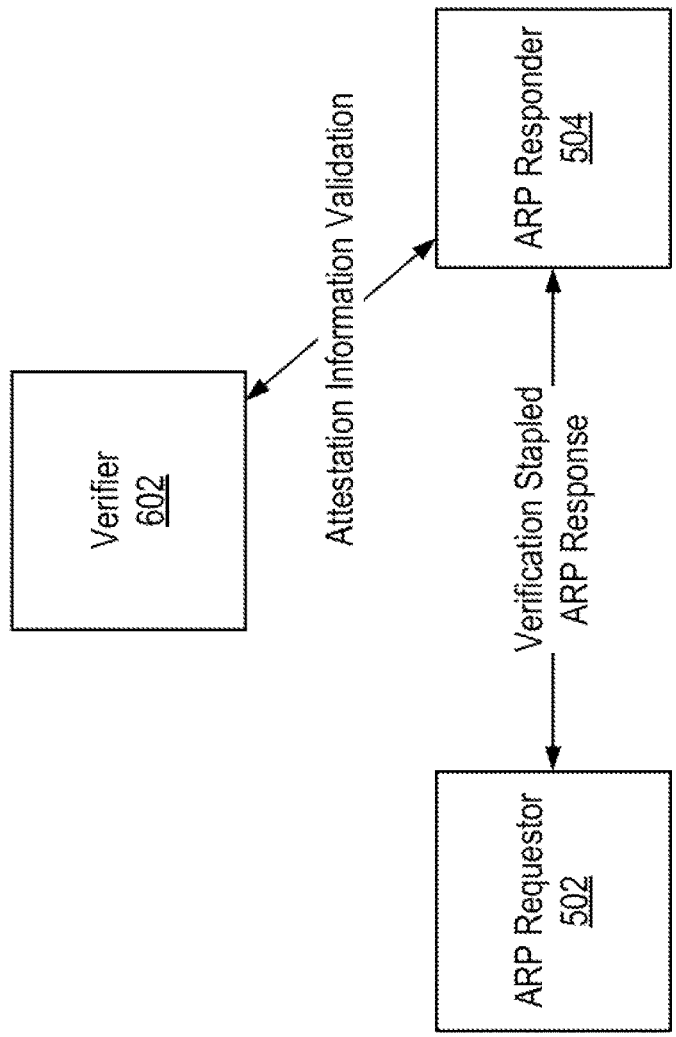
FIG. 7 illustrates another example operational configuration of the network environment for verifying ARP responders based on attestation information.

FIG. 7 illustrates another example operational configuration of the network environment 500 for verifying ARP responders based on attestation information. In the example configuration shown in FIG. 7, the ARP responder 504 can communicate with the verifier 602 to validate attestation information before it is sent to the ARP requestor 502 as part of an ARP response. Specifically, the ARP responder 504 can send the attestation information to the verifier 602 and the verifier 602 can either validate or invalidate the attestation information. For example, the verifier 602 can validate or invalidate the attestation information by comparing the attestation information with verified states of the ARP responder 504. If the verifier 602 validates the attestation information, then the verifier can provide an indicator of the validity of the attestation information back to the ARP responder 504. For example, the verifier 602 can provide a verifier signed key for the attestation information back to the ARP responder 504.

The ARP responder 504 can staple the attestation information with the indicator of the validity of the attestation information provided by the verifier 602 in the ARP response. For example, the ARP responder 504 can staple the attestation information with the verifier signed key. In turn, the ARP responder 504 can provide the ARP response including the stapled attestation information, e.g. stapled with the verifier signed key, to the ARP requestor 502.

The ARP requestor 502 can then verify the trustworthiness of the ARP responder 504 based on the stapled ARP response. Specifically, as the ARP response is already stapled with the indicator of the validity of the attestation information, e.g. the verifier signed key, the ARP requestor 502 can trust that the provided attestation information is valid. More specifically, the ARP requestor 502 can trust that the provided attestation information is valid without communicating with the verifier 602 to validate the attestation information. In turn, the ARP requestor 502 can locally verify that the ARP responder 504 is trustworthy, without communicating with the verifier 602. This can save time and computational resources, as the step of the ARP requestor 502 communicating with the verifier 602 to validate the attestation information, as shown in the example operational configuration of the network environment 500 shown in FIG. 6, can be skipped.

In the example operational configuration shown in FIG. 7, the ARP responder 504 can communicate with the verifier 602 to validate the attestation information as the attestation information is generated for the ARP responder 504. Further, the ARP responder 504 can communicate with the verifier 602 to validate the attestation information before the ARP request is received at the ARP responder 504. By validating the attestation information before the ARP request is received at the ARP responder 504, the amount of time between when the ARP responder 504 receives the ARP request and sends the ARP response back to the ARP requestor 502 can be reduced. This can improve overall performance within the network environment 500.

The indicator of the validity of the attestation information, e.g. the verifier signed key, can be associated with a validity time frame. Specifically, the verifier 602 can create a verifier signed key that is valid for a specific amount of time. As follows, the ARP requestor 502 can verify the ARP responder 504 based on the indicator of the validity of the attestation information if the validity time frame of the indicator is still active, e.g. the indicator has not expired. If the validity time frame of the indicator has expired, then the ARP requestor 502 can attempt to validate the attestation information by communicating directly with the verifier 602.

While the disclosure has described the ARP requestor 502 verifying the trustworthiness of the ARP responder 504, the techniques and operational configurations described herein can be used to verify the trustworthiness of the ARP requestor 502. Specifically, the trustworthiness of the ARP requestor 502 can be verified from the perspective of the ARP responder 504 based on attestation information associated with the ARP requestor 502. In turn, applicable actions can be taken, e.g. by the ARP responder 504, based on whether the ARP requestor 502 is verified as trustworthy.

The ARP requestor 502 can be verified based on attestation information included in the ARP request sent to the ARP responder 504. In turn, the ARP responder 504 and/or the verifier 602 can verify the trustworthiness of the ARP requestor 502 using the attestation information included in the ARP request sent by the ARP requestor 502.

Applicable ARP attack mitigation techniques can be performed, e.g. by the ARP responder 504, based on whether the ARP requestor 502 is verified as trustworthy or untrustworthy. Specifically, the ARP responder 504 can ignore the ARP request, or otherwise not respond to the ARP request with an ARP response, if the ARP requestor 502 is verified as untrustworthy. Further, if the ARP requestor 502 is verified as untrustworthy, then the ARP responder 504 can institute techniques to avoid attacks, e.g. packet level attacks, made by the ARP requestor 502. For example, the ARP responder 504 can implement one or more filters that filter packets received from the ARP requestor 502 if the ARP responder 504 is verified as untrustworthy.

Alternatively, if the ARP requestor 502 is verified as trustworthy based on attestation information included in the ARP request, then the ARP responder 504 can function appropriately, e.g. as part of performing address resolution through ARP. Specifically, if the ARP requestor 502 is verified as trustworthy, then the ARP responder 504 can proceed with generating and sending the ARP response with the attestation information of the ARP responder 504. In turn, the attestation information of the ARP responder 504 that is included in the ARP responder can be used to verify the trustworthiness of the ARP responder 504.

The disclosure now turns to FIGS. 8 and 9, which illustrate example network nodes and computing devices, such as switches, routers, client devices, endpoints, servers, and so forth.

FIG. 8 illustrates an example network device 800 suitable for performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 can accomplish these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    receiving, at an Address Resolution Protocol (ARP) responder, an ARP request from an ARP requestor for performing address resolution between the ARP requestor and the ARP responder in a network environment, wherein the ARP request includes requestor attestation information of the ARP requestor for verifying trustworthiness of one or more of hardware and software associated with the ARP requestor;
    verifying trustworthiness of the ARP requestor using the requestor attestation information of the ARP requestor included in the ARP request;
    performing the address resolution between the ARP requestor and the ARP responder based on whether the ARP requestor is verified as trustworthy or untrustworthy;
    building, by the ARP responder, an ARP response including attestation information of the ARP responder;
    providing, from the ARP responder to the ARP requestor, the ARP response and the attestation information of the ARP responder for verifying the ARP responder using the ARP response and the attestation information of the ARP responder; and
    verifying the ARP responder based on at least one or more attestation information of the ARP responder that is verified before the ARP request is received.

2. The method of claim 1, further comprising:
    extracting a media access control (MAC) address of the ARP responder and an Internet Protocol (IP) address of the ARP responder from the ARP response; and
    adding an ARP entry including a mapping of the MAC address of the ARP responder with the IP address of the ARP responder.

3. The method of claim 1, further comprising facilitating ARP attack mitigation in the network environment if the ARP responder is not verified using the attestation information in the ARP response.

4. The method of claim 3, wherein the ARP attack mitigation includes refraining from adding an entry including a mapping of a MAC address of the ARP responder with an IP address of the ARP responder in an ARP mapping data store.

5. The method of claim 3, wherein the ARP attack mitigation includes sending an alert indicating that the ARP responder failed verification using the attestation information.

6. The method of claim 3, wherein the ARP attack mitigation includes creating a log entry indicating the ARP responder failed verification using the attestation information and a mapping of a MAC address of the ARP responder with an IP address of the ARP responder.

7. The method of claim 1, further comprising sending the attestation information of the ARP responder from the ARP requestor to a verifier, wherein the verifier is configured to remotely verify the ARP responder using the attestation information of the ARP responder received from the ARP requestor.

8. The method of claim 1, further comprising:
stapling, by the ARP responder, the attestation information included in the ARP response with a verifier signed key, wherein the verifier signed key is generated based on a verifier validating the attestation information; and
sending the ARP response including the attestation information with the verifier signed key from the ARP responder to the ARP requestor, wherein the ARP requestor is configured to locally verify the ARP responder using the attestation information and the verifier signed key received from the ARP responder.

9. The method of claim 8, wherein the verifier validates the attestation information to generate the verifier signed key before the ARP request is received at the ARP responder from the ARP requestor.

10. A system comprising:
one or more processors; and
a computer-readable medium comprising instructions stored therein, which when executed by the one or more processors, cause the one or more processors to:
receive an ARP request from an Address Resolution Protocol (ARP) requestor sent to an ARP responder for performing address resolution between the ARP requestor and the ARP responder in a network environment, wherein the ARP request includes requestor attestation information of the ARP requestor for verifying trustworthiness of one or more of hardware and software associated with the ARP requestor;
verify trustworthiness of the ARP requestor using the requestor attestation information of the ARP requestor included in the ARP request;
perform the address resolution between the ARP requestor and the ARP responder based on whether the ARP requestor is verified as trustworthy or untrustworthy;
build an ARP response including attestation information of the ARP responder;
provide the ARP response and the attestation information of the ARP responder, to the ARP requestor from the ARP responder for verifying the ARP responder using the ARP response and the attestation information of the ARP responder; and
verifying the ARP responder based on at least one or more attestation information of the ARP responder that is verified before the ARP request is received.

11. The system of claim 10, wherein the instructions, which when executed by the one or more processors, further cause the one or more processors to:
extract a media access control (MAC) address of the ARP responder and an Internet Protocol (IP) address of the ARP responder from the ARP response; and
add an ARP entry including a mapping of the MAC address of the ARP responder with the IP address of the ARP responder.

12. The system of claim 10, wherein the instructions, which when executed by the one or more processors, further cause the one or more processors to facilitate ARP attack mitigation in the network environment if the ARP responder is not verified using the attestation information in the ARP response.

13. The system of claim 12, wherein the ARP attack mitigation includes refraining from adding an entry including a mapping of a MAC address of the ARP responder with an IP address of the ARP responder in an ARP mapping data store.

14. The system of claim 12, wherein the ARP attack mitigation includes sending an alert indicating that the ARP responder failed verification using the attestation information.

15. The system of claim 12, wherein the ARP attack mitigation includes creating a log entry indicating the ARP responder failed verification using the attestation information and a mapping of a MAC address of the ARP responder with an IP address of the ARP responder.

16. The system of claim 10, wherein the instructions, which when executed by the one or more processors, further cause the one or more processors to sending the attestation information of the ARP responder from the ARP requestor to a verifier, wherein the verifier is configured to remotely verify the ARP responder using the attestation information of the ARP responder received from the ARP requestor.

17. The system of claim 10, wherein the instructions, which when executed by the one or more processors, further cause the one or more processors to:
staple, by the ARP responder, the attestation information included in the ARP response with a verifier signed key, wherein the verifier signed key is generated based on a verifier validating the attestation information; and
send the ARP response including the attestation information with the verifier signed key from the ARP responder to the ARP requestor, wherein the ARP requestor is configured to locally verify the ARP responder using the attestation information and the verifier signed key received from the ARP responder.

18. The system of claim 17, wherein the verifier validates the attestation information to generate the verifier signed key before the ARP request is received at the ARP responder from the ARP requestor.

19. A non-transitory computer-readable storage medium comprising instructions stored therein, which when executed by one or more processors, cause the one or more processors to:
receive an ARP request from an Address Resolution Protocol (ARP) requestor sent to an ARP responder for performing address resolution between the ARP requestor and the ARP responder in a network environment, wherein the ARP request includes requestor attestation information of the ARP requestor for verifying trustworthiness of one or more of hardware and software associated with the ARP requestor;
verify trustworthiness of the ARP requestor using the requestor attestation information of the ARP requestor included in the ARP request;
perform the address resolution between the ARP requestor and the ARP responder based on whether the ARP requestor is verified as trustworthy or untrustworthy;
build an ARP response including attestation information of the ARP responder;
provide the ARP response and the attestation information of the ARP responder, to the ARP requestor from the ARP responder for verifying the ARP responder using the ARP response and the attestation information of the ARP responder; and
verifying the ARP responder based on at least one or more attestation information of the ARP responder that is verified before the ARP request is received.

20. The non-transitory computer-readable storage medium of claim 19, wherein the instructions, which when executed by the one or more processors, further cause the one or more processors to:
- extract a media access control (MAC) address of the ARP responder and an Internet Protocol (IP) address of the ARP responder from the ARP response; and
- add an ARP entry including a mapping of the MAC address of the ARP responder with the IP address of the ARP responder.

* * * * *